United States Patent

[11] 3,611,916

[72] Inventor Stephen Valan
 1018 Apgar Terrace, Rahway, N.J. 07065
[21] Appl. No. 812,784
[22] Filed Apr. 2, 1969
[45] Patented Oct. 12, 1971

[54] BUNDLE-BINDING MACHINE AND PROCESS
 12 Claims, 30 Drawing Figs.
[52] U.S. Cl. .................................................. 100/4,
 53/135, 100/7, 100/17, 100/20, 100/30, 100/290
[51] Int. Cl. ......................................................... B65b 13/34
[50] Field of Search ............................................. 100/22,
 175, 3, 4, 8, 7, 17, 2, 18, 19, 20, 21, 30, 290, 268;
 53/198, 3, 135

[56] References Cited
UNITED STATES PATENTS

| | | | |
|---|---|---|---|
| 1,324,239 | 12/1919 | Evans | 100/20 |
| 2,982,063 | 5/1961 | Coleman et al. | 53/3 |
| 3,039,382 | 6/1962 | Simon et al. | 100/268 X |
| 3,104,606 | 9/1963 | Kerrigan | 100/30 X |
| 3,183,824 | 5/1965 | Cook | 100/4 |
| 3,228,321 | 1/1966 | Walters | 100/17 |
| 3,269,300 | 8/1966 | Billett et al. | 100/8 |
| 3,353,478 | 11/1967 | Hopkins | 100/290 X |
| 3,001,346 | 9/1961 | Kiwi | 53/135 |
| 3,070,929 | 1/1963 | Kiwi | 53/135 |

FOREIGN PATENTS

| | | | |
|---|---|---|---|
| 648,171 | 9/1962 | Canada | 100/17 |

Primary Examiner—Billy J. Wilhite
Attorney—Samuelson & Jacob

ABSTRACT: Bundles are bound by twine in a machine having a frame carrying a horizontal platform having space above it for pushing in bundles to be bound. Centrally mounted on the top of the frame is a ram motor which projects forwardly and above the platform space. It carries a vertically reciprocative ram, on the bottom of which is mounted a twine-aligning assembly designed to pass twine through it and to, project the twine away from it and into the gripping means when the ram reaches the bottom of its stroke. A feeding means on the top of the frame feeds a supply of slack-free twine to and through the assembly. One switch is provided for actuating the ram motor for the downward stroke of the ram after the bundle has been pushed onto the platform. Another switch is actuatable by the ram at the end of its downward stroke and it serves to initiate the twine gripping, crimping and cutting mechanisms. The twine-gripping mechanism is mounted below the platform and it serves to grip the twine after it has been inserted therein by the assembly, and it holds the twine during and after the binding operation. Thereafter, the twine is fastened by a clip, a crimped strip piece of metal in a mechanism mounted below the platform. A cutting mechanism then cuts the twine free of its supply, and a third switch actuates the ram motor to return the ram to its uppermost position while the twine is held by the gripping mechanism so that a length of twine is stretched vertically across the space above the platform. A pushing means pushes the bundle into the length of stretched twine until the bundle is on the platform encompassed on three sides by the twine. By actuating the first switch, the ram, on its downward stroke, effects complete encirclement of the bundle, after which the gripping, crimping and cutting mechanisms complete the binding operation. An alternative cutting means, when using a thermoplastic twine, consists in cutting the twine with a heated knife with enough contact time to fuse together the two cut ends below the clip and thus strengthen further the binding.

INVENTOR.
STEPHEN VALAN

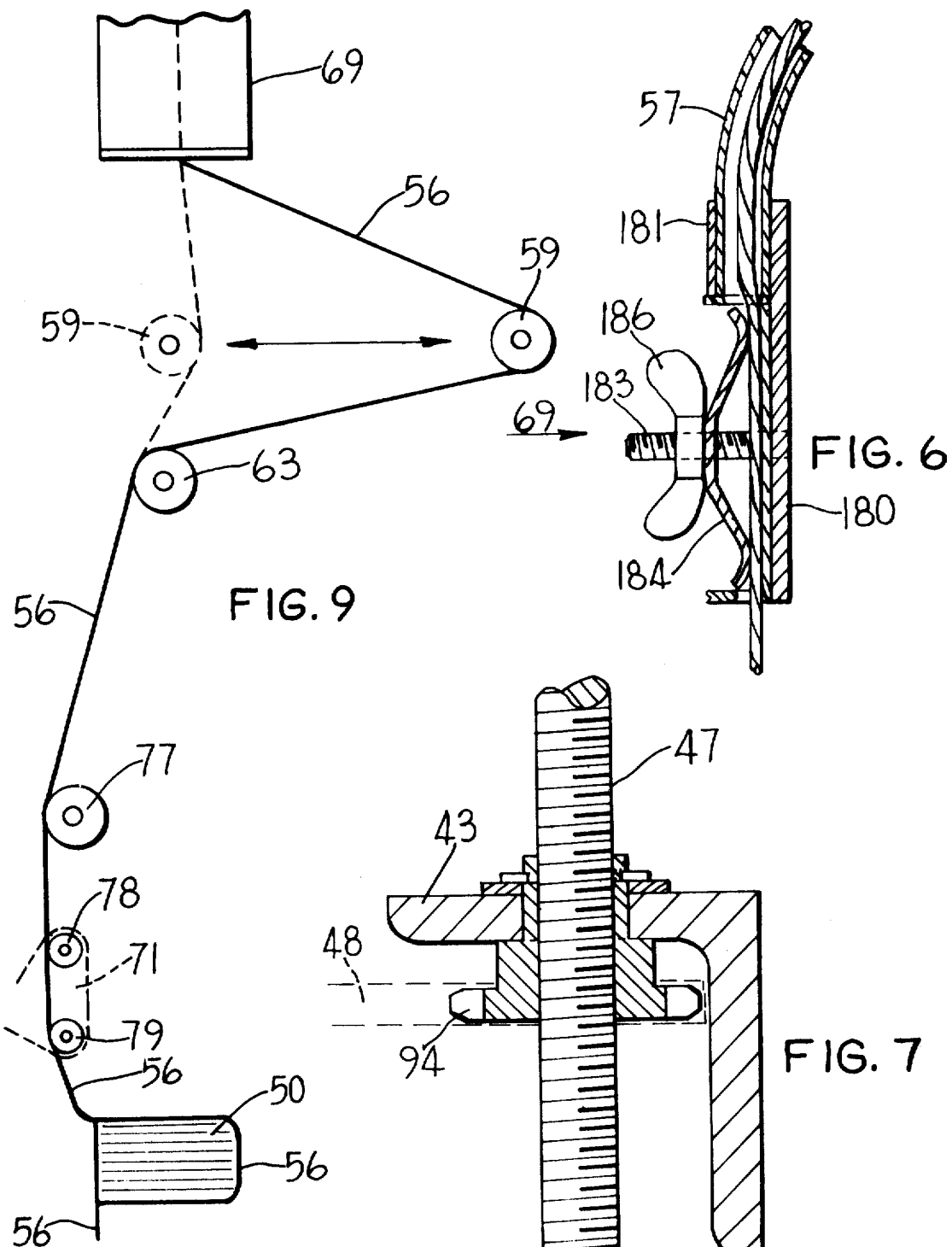

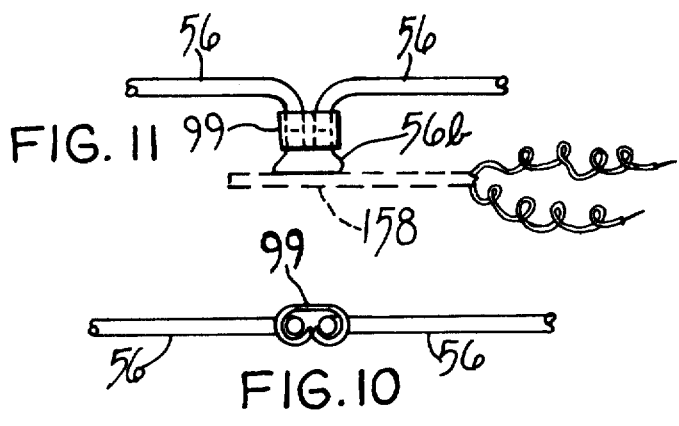
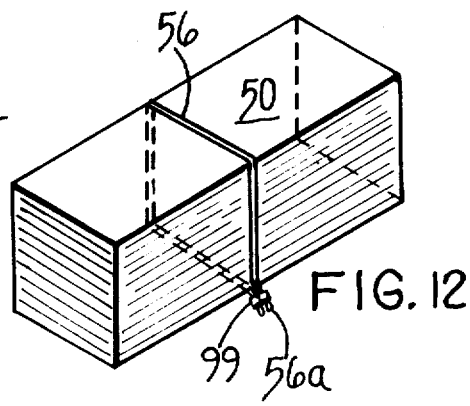
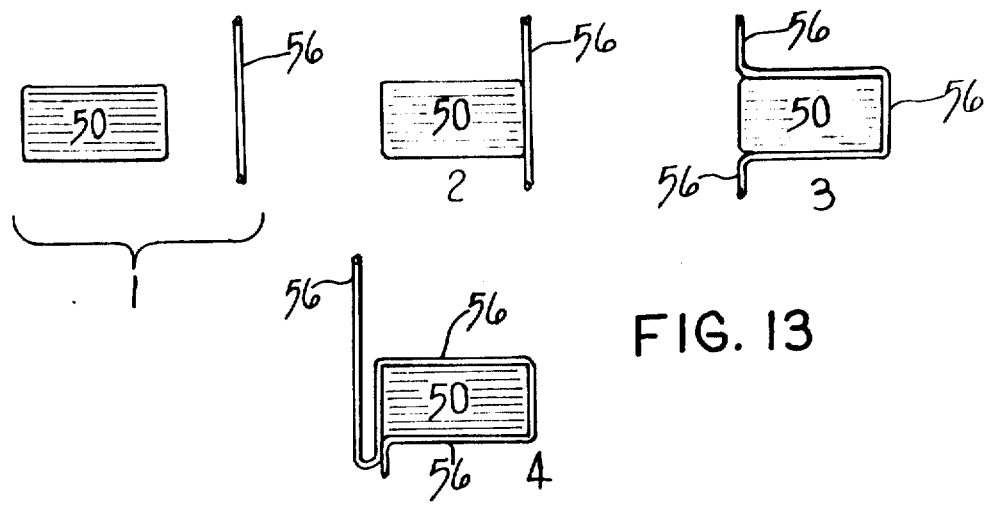
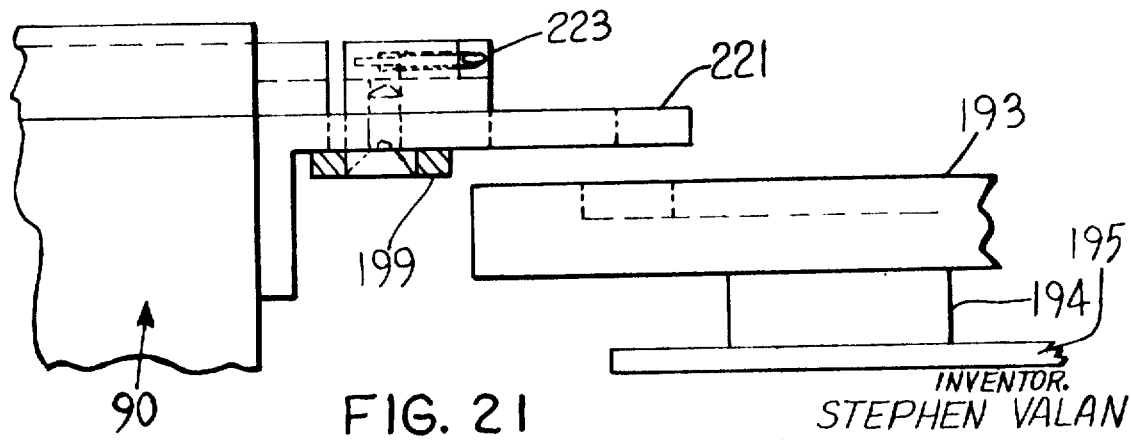

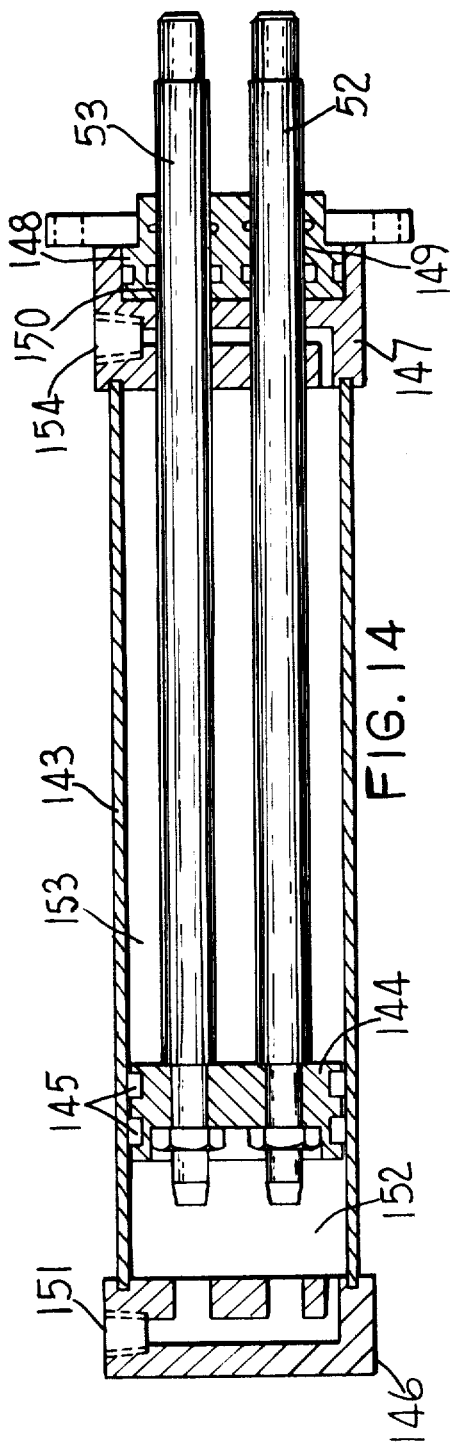

INVENTOR.
STEPHEN VALAN
ATTORNEY

INVENTOR.
STEPHEN VALAN
ATTORNEY

INVENTOR.
STEPHEN VALAN
BY
ATTORNEY 3,611,916

BUNDLE-BINDING MACHINE AND PROCESS

BACKGROUND OF THE INVENTION

This invention deals with a machine for binding bundles of paper, cartons, or other bulky material generally arranged in a flat, square or rectangular form, by use of a twine, preferably a plastic twine, the ends of which are fastened with a metal clip, and with ends protruding from the clip sealed together by means of heat.

Bundles of this type have been bound in the prior art by means of steel strapping or wire. Such prior art methods have been costly and the machines used have been both costly and complicated. Also, in the case of wire, the fastened wire ends have been found to present a hazard both in tearing the handler's skin as well as the clothes.

SUMMARY OF THE INVENTION

According to the present invention, the bundle is readily bound with plastic twine by pushing the bundle on a platform into a vertical length of twine, one end of the twine being secured in a gripping mechanism directly below the bundle, while the twine is fed from a supply located above the bundle. The bundle is advanced until the twine fully encircles the bundle on three of its sides. At this point, a dual plunger, carrying the twine-aligning assembly, descends from above and moves vertically in front of the bundle, bringing the twine with it across the front face of the bundle to complete envelopment of the fourth side of the bundle with the twine. At the end of the plunger stroke the aligning assembly swings out to insert the twine into the gripping mechanism disposed on the frame below the platform. Then a switch actuates a cam motor so that both ends of the twine are crimped together with a metal clip, and cut by means of sliding knives or by a heated knife, which also fuses the free plastic ends of the twine. The bundle is then pushed through the machine, and the sequence repeats.

It has been found that use of the aforesaid machine and method can effect a savings in cost as much as 90 percent of the cost when using conventional steel strapping. Also, the time required per bundle is substantially reduced due to the simplicity of design and operation. A much stronger binding is effected, particularly when the plastic twine is fastened with a clip and the twine ends are heat sealed. When compared with conventional cord-tying methods which employ a "swinging pendulum" type of operation, the safety hazard is greatly reduced by use of the vertical stroke means of operation.

The weakest point in conventional binding or tying methods has been in the securing of the ends of the binding material. For this reason, a steel strap or wire are preferred, although the tensile strength of the material far exceeds the actual requirements. A typical case is the binding of newspaper bundles which is at present effected by round wire, the ends of which are twisted together. The present invention can replace such a method with great savings in cost and with greater safety.

BRIEF DESCRIPTION OF THE DRAWINGS

The invention will be more readily understood by reference to the accompanying drawings in which a preferred embodiment is described, and in which:

FIG. 6 shows an enlarged cross-sectional view of the tensioner taken along the plane of line 6—6 in FIGURE 5;

FIG. 7 presents a cross-sectional view of a corner of the upper frame to show details of the mounting of the pressure-plate-driving rods;

FIG. 9 illustrates a schematic presentation of the twine layout in the unit;

FIG. 10 shows a bottom view of the twine ends as fastened onto the bundle with a crimped clip;

FIG. 11 presents a side view of the same ends as alternatively cut and sealed together with a heated knife;

FIG. 12 depicts a perspective view of the bundle as fastened with a crimped clip;

FIG. 13 shows a schematic side view of the bundle being bound by the twine during the series of steps in the binding operation;

FIG. 14 presents a cross-sectional side view of the air motor employing dual rams;

FIG. 15 illustrates a bottom view of the unit shown in FIG. 14;

FIG. 16 depicts a top view of a heated knife for cutting and sealing the fastened ends of the twine;

FIG. 17 shows a side view of the unit depicted in FIG. 16;

FIG. 18 presents a rear cross-sectional view taken along the plane of line 18—18 in FIG. 16;

FIG. 21 illustrates a front elevational view, partly in cross section, of the unit shown in FIG. 19;

The same numerals refer to the same parts in the various figures.

DESCRIPTION OF THE PREFERRED EMBODIMENTS

Figure 1:
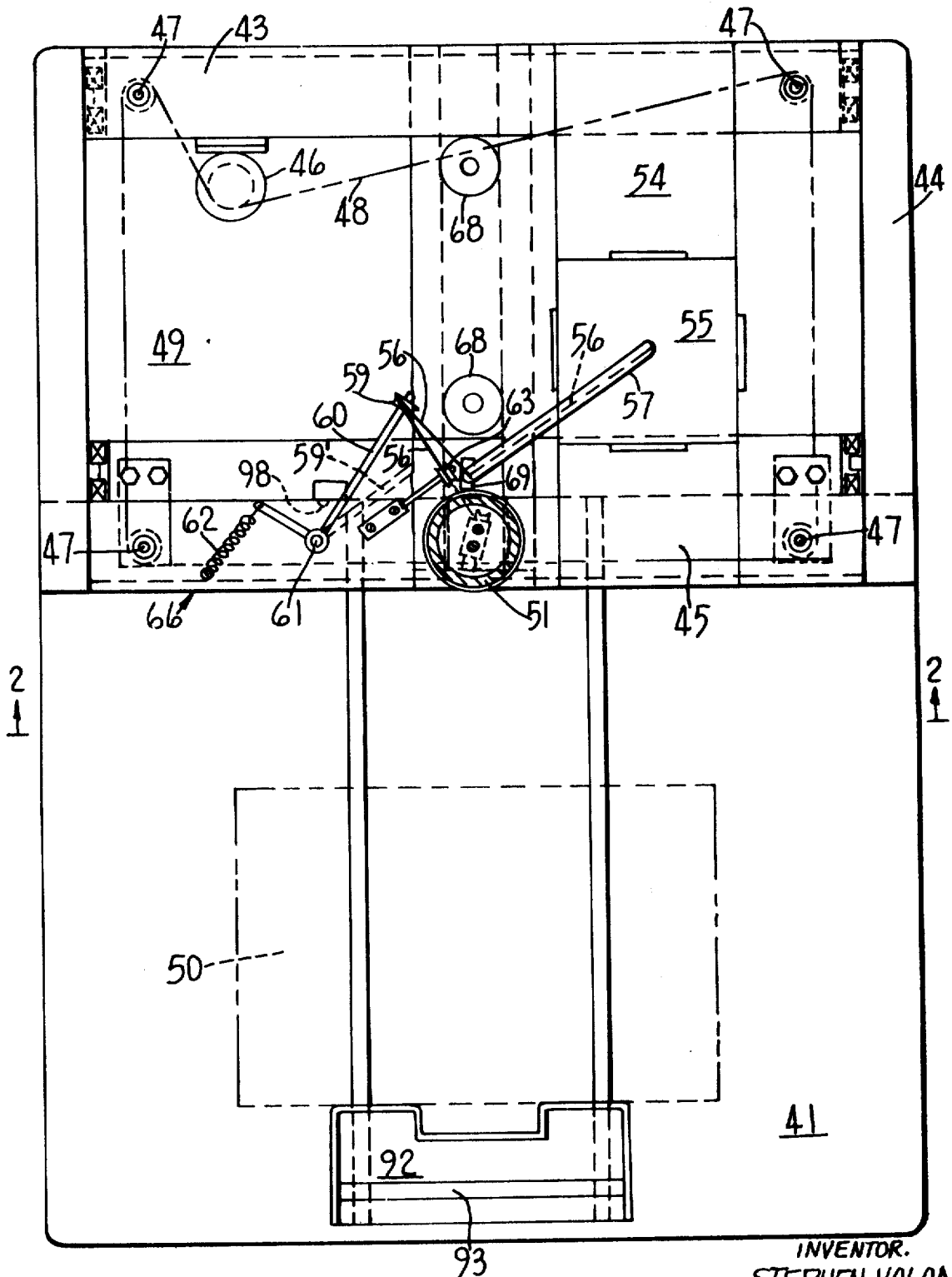
FIG. 1 depicts a top or plan view of a preferred embodiment of the invention, with the top portion of the ram air motor cut away.

Referring to the drawings, and first to FIGS. 1-5, numeral 40 designates a frame having a lower platform or shelf 41 on which a bundle 50 is placed for binding with twine 56. Upper crossmembers 42, 43, 44 and 45 serve to strengthen frame 40 and to serve as mountings for electric motor 46 and for the plate-moving threaded rods 47, which are moved vertically by motor-driven chain 48 to raise or lower pressure plate 49. The latter serves to hold down bundle 50 on platform 41. Plate 49 is resiliently attached to the threaded rods 47 by first being connected at the bottoms of the rods onto angle members 65 and 66, the latter being connected, via air cylinders 68, to pressure plate 49. The air cylinders provide a cushioning effect for pressure plate 49 upon the bundle 50. The details of construction of rods 47 and their operation will be discussed later.

Reinforcing crossmember 45 has a forwardly projecting extension 45′ onto which is mounted pneumatic or hydraulic ram motor 51. This is of conventional type with the exception that it moves vertically a double ram composed of members 52 and 53, the details of which and the reasons for which will be given later.

Cover plate 54 holds twine box 55 containing ball or cone 67 from which is fed the plastic twine 56 used for binding bundle 50. This twine is first passed through a guide tube 57, which is attached onto motor 51 by bracket 58, then, the twine passes through tensioner 69, the details of which are given in FIG. 6. A slack takeup roller 59 rides on shaft 60 and is mounted on pivot 61. Shaft 60 operates as a lever with one end attached to spring 62, which has its other end affixed to crossmember 45. Thus, roller 59 may move laterally to position 59', depending on the slack on twine 56. Thereafter, the twine passes over vertical guide roller 63, the shaft of which is also mounted on crossmember 45.

Attached to the lower ends of dual rams 52—53 is the twine-aligning assembly, indicated generally as 64. Rams 52 and 53 pass through cylinder rod guide block 72, which is attached to the top of angle member 66 at 70. Twine 56 moves over roller 77 on block 72, and over rollers 78 and 79 on setting arm 71. The latter is pivoted (FIG. 5) near its center at 76 and its twine-guiding portion 73 is in a position so that rollers 78–79 are vertically in line when rams 52–53 are at their uppermost position A in FIG. 2, and in substantially horizontal alignment, when the rams are in lowermost position B, at which time the setting arm is in the position shown by the broken lines in FIG. 5.

Figure 2:
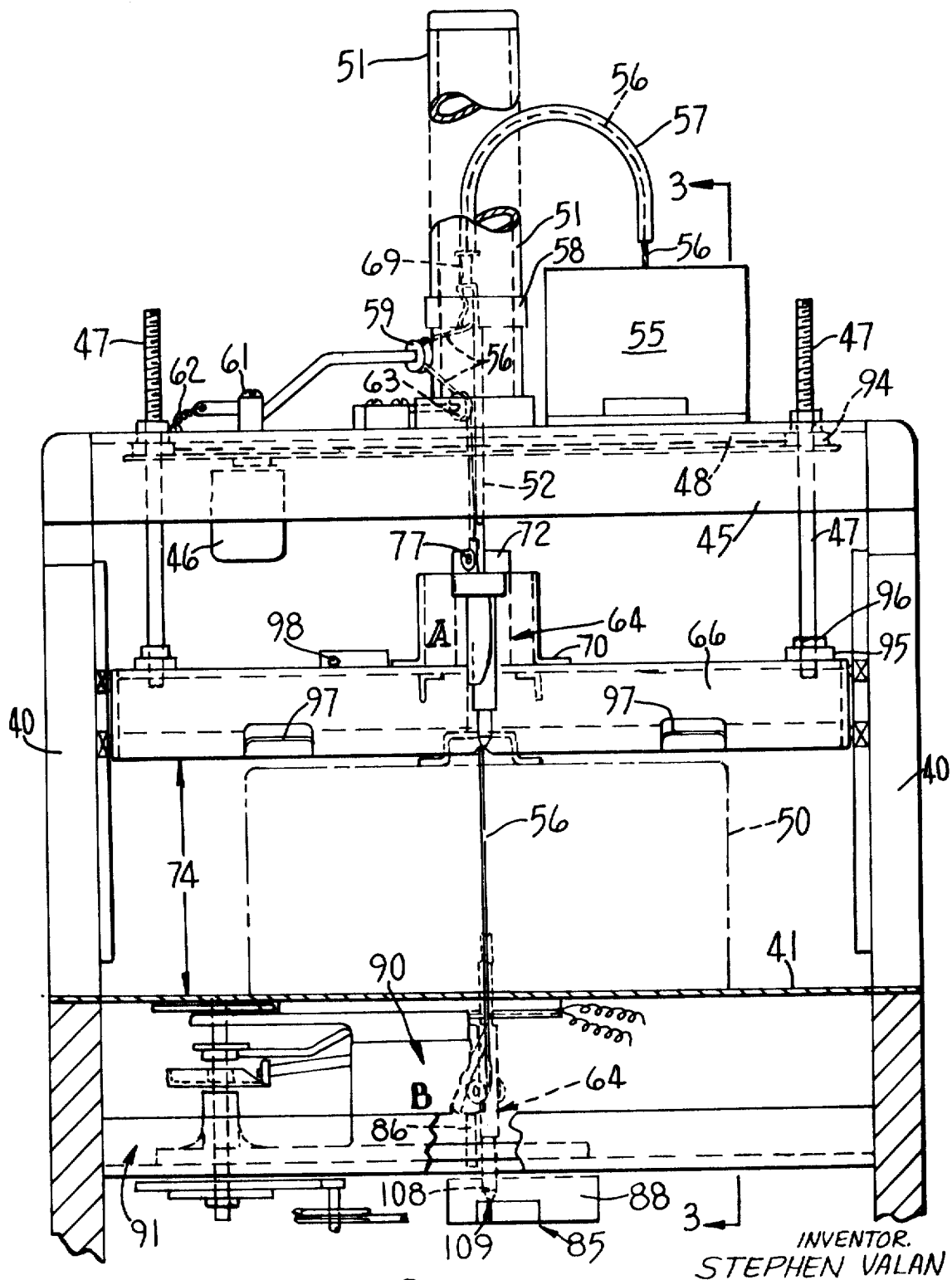
FIG. 2 illustrates a front elevational cross-sectional view taken along the plane of line 2—2 in FIG. 1, but with the center portion of the ram motor, and the lower portion of the frame, cut away.

Setting arm 71 of movable assembly 64 has a roller-ended terminal portion 82 which is maintained in downwardly directed position by a spring 83 until the assembly reaches position B in FIG. 2. At the bottom of the machine, and attached to the frame 40 via member 91, is an arm actuator and switch assembly indicated generally as 85. A vertically projecting pin 86 is mounted adjustably on angle member 88. When assembly 64 reaches position B (FIG. 2), arm end 82 is pushed upwardly by pin 86, against the action of spring 83, causing rollers 78 and 79 on setting arm 71 to swing out twine 56 as in FIG. 8, and as in the broken line position in FIG. 5, into the twine holder, indicated generally as 90. The latter is mounted on a crossmember 91 connected to frame 40.

Figure 3:
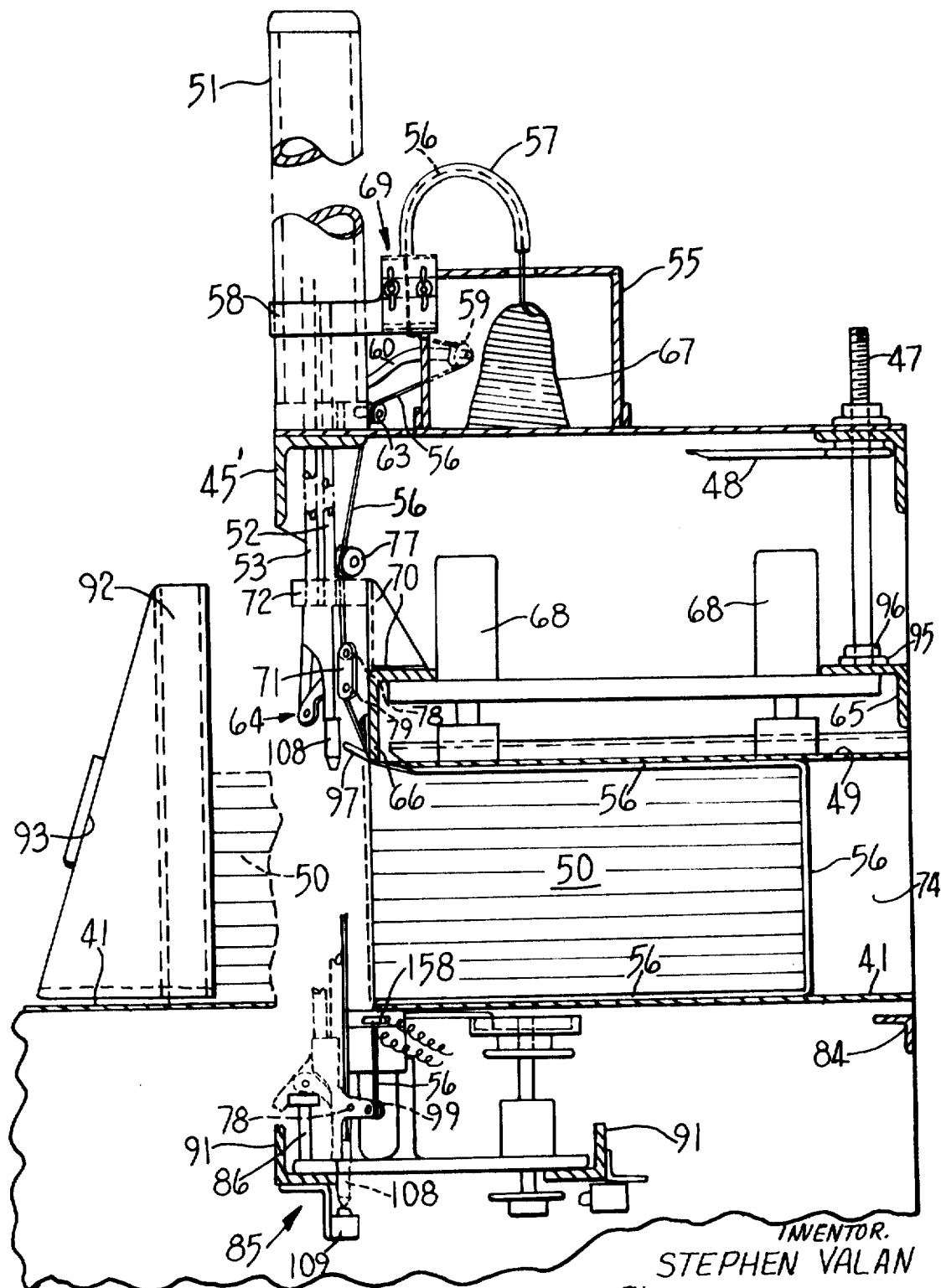
FIG. 3 presents a side elevational cross-sectional view taken along the plane of line 3—3 in FIGURE 2, but with the portion between the pusher and the twine-aligning assembly cut away.

Platform 41 is extended forwardly FIGS. 1 and 3) to enable placement thereon of a pushing member or pusher 92 having a handle 93, this is placed ahead of bundle 50 and is used to push the bundle into and through the machine.

To summarize the operation of the machine to this stage of the description, the operation is as follows (FIG. 9):

The machine is set up by threading twine 56 from cone 67 in box 55, through guide tube 57, through tensioner 69, then over slack takeup roller 59, over vertical guide rollers 63 and 77, and thence over rollers 78–79 in the aligning assembly 64. Thereafter twine 56 is drawn across adjustable throat 74 (FIG. 2) of the machine to twine holder 90 disposed below platform 41. Spring 83 keeps the twine setter arm 71 in upright position until it strikes pin 86.

The pressure plate 49 is adjustable by electric motor 46 to the desired height of bundle 50. Motor 46 drives chain 48 over sprockets 94 (FIG. 7) disposed on the four threaded rods 47. The sprockets carry internal threads to coact with threads on the rods 47, and they are held "captive" in cross-angles 43 and 45 of the frame, so that, as the sprockets are rotated, the four threaded rods 47 are raised or lowered simultaneously. The bottom ends of the threaded rods 47 are screwed into the pressure plate frame at 95 (FIG. 3) and the rods are prevented from rotating, by means of jamnuts 96, which also provide a means of adjustment, when necessary. Air cylinders 68, fed by air tubes 75 (FIG. 5) serve to compensate for variations in size of the bundles 50 and provide means for adjusting pressure to compress the material comprising the bundle.

Bundle 50 is pushed into opening or throat 74 under pressure plate 49 by means of pusher 92, which may be manually or automatically operated. Angled ends 97 (FIGS. 3 and 5) on pressure plate 49 serve to guide the bundles 50. As the bundle 50 is pushed into twine 56, disposed across throat 74, the twine is forced around three sides of the bundle (FIG. 13), until bundle 50 is entirely under pressure plate 49, at which time pusher 92 then presses against and actuates cylinder motor switch 98 (FIG. 1) mounted on the front of angle member 66 of pressure plate 49. Switch 98 actuates a conventional four-way valve (not shown) which, in turn, pressurizes the cylinder of motor 51 to force rams 52–53 for the downward stroke.

As the twine-aligning assembly 64 starts downwardly from position A in FIG. 2, the bundle 50 is in binding position under pressure plate 49, and the twine is centrally wrapped around three faces of the bundle. The rams now will carry twine 56 across the face of the bundle 50 and, when they reach position B in FIG. 2, downwardly projecting pin 108 disposed on the bottom of assembly 64, will press on solenoid switch 109 which starts the cam cycles for clip preform, final crimping and twine cutting operations at 90.

It might be mentioned that, at the first movement of rams 52–53, any twine slack which may occur is taken up by slack takeup roller 59 (FIG. 9), which is on spring-loaded arm 60. The tension on this spring is set lower than that on twine tensioner 69, as the twine tensioner is set to obtain the desired tautness of twine around the bundle 50.

As seen in FIG. 6, twine tensioner 69 is attached to one end of twine guide 57. It consists of a backing plate 180 attached at its upper end at 181 to guide tube 57. Two screws 182 and 183 which have their ends attached to backing plate 180, hold front spring plate 184, and thumbscrews 185 and 186 serve to put tension on spring plate 184 which, in turn impresses tension upon twine 56 passing between the two screws 182–183.

Figure 8:
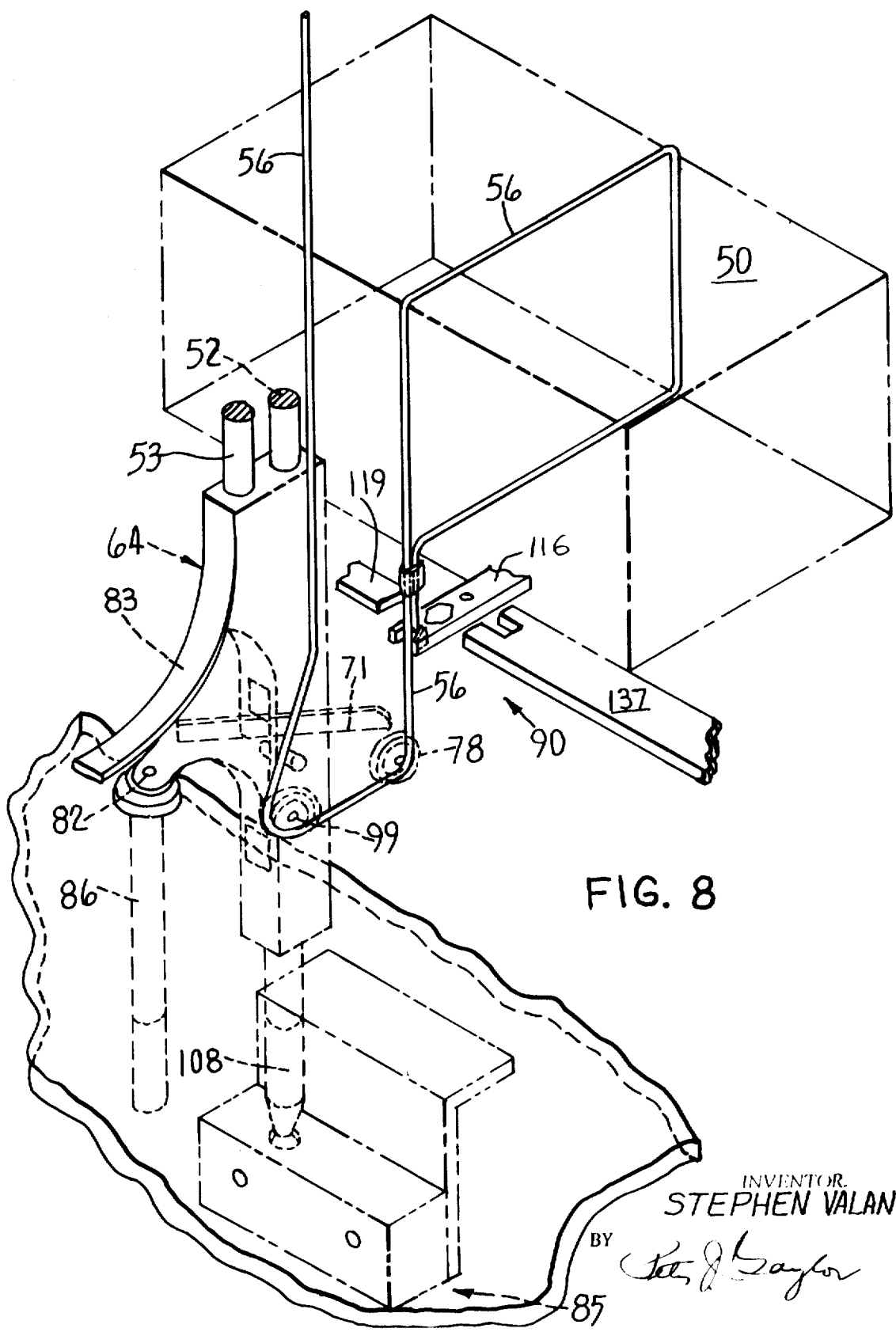
FIG. 8 illustrates a schematic perspective view of the twine binding the bundle and the associated twine gripping and cutting units.

The alignment of the twine 56 into the twine gripping, fastening and cutting mechanism 90 is more clearly shown in FIG. 8, wherein bundle 50 is already circumscribed by twine 56, and aligning assembly 64 is at its lowest position, at which point setting arm 71 is pushed to substantially horizontal position by pin 86. This serves to extend roller 78 so that twine 56 is moved into twine pickup finger 116. The relative positions of knives 119 and clip-forming bar 137 are also apparent.

Cutoff knives 119 (or hot cutoff knife 158) are mounted above twine-gripping assembly 90 (FIG. 8), and a retractable clip preform anvil 120 is disposed between arms 137 and 134. Metal strip 121 is fed from a roll 219 (FIG. 19) ahead of preform anvil 120, for crimping metal strip around twine 56. Twine-gripping laterally moving arm 116 and laterally vertically moving arm 122 are held between housing elements 123 and 124, both of which have cutoff recesses 125 and 126 to accommodate twine-holder-gripping jaw 122, which is pivoted at 127. Spring 128, disposed within recesses 129-130 in gripping elements 116 and 122, serves to separate the latter two elements when cam follower 115 forces finger 116 outwardly until the ends of arm 122 slip into cutout recesses 125 and 126. Closing lever 113, which is pivoted at 131, serves to close gripping jaw 122 against jaw 116.

Figure 4:
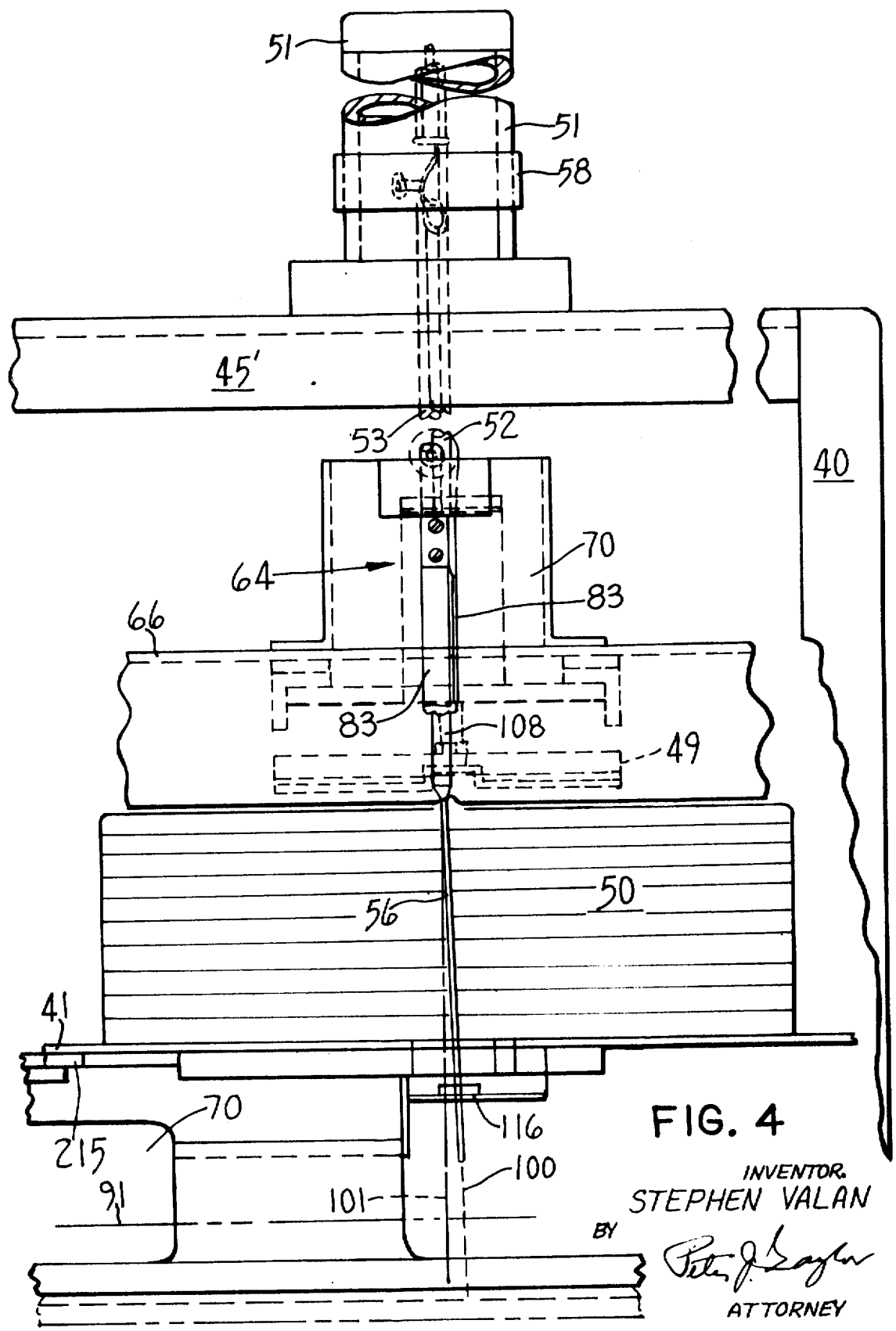
FIG. 4 shows an enlarged front elevational view, of the twine-aligning assembly and related portions of the unit depicted in FIG. 2.
Figure 5:
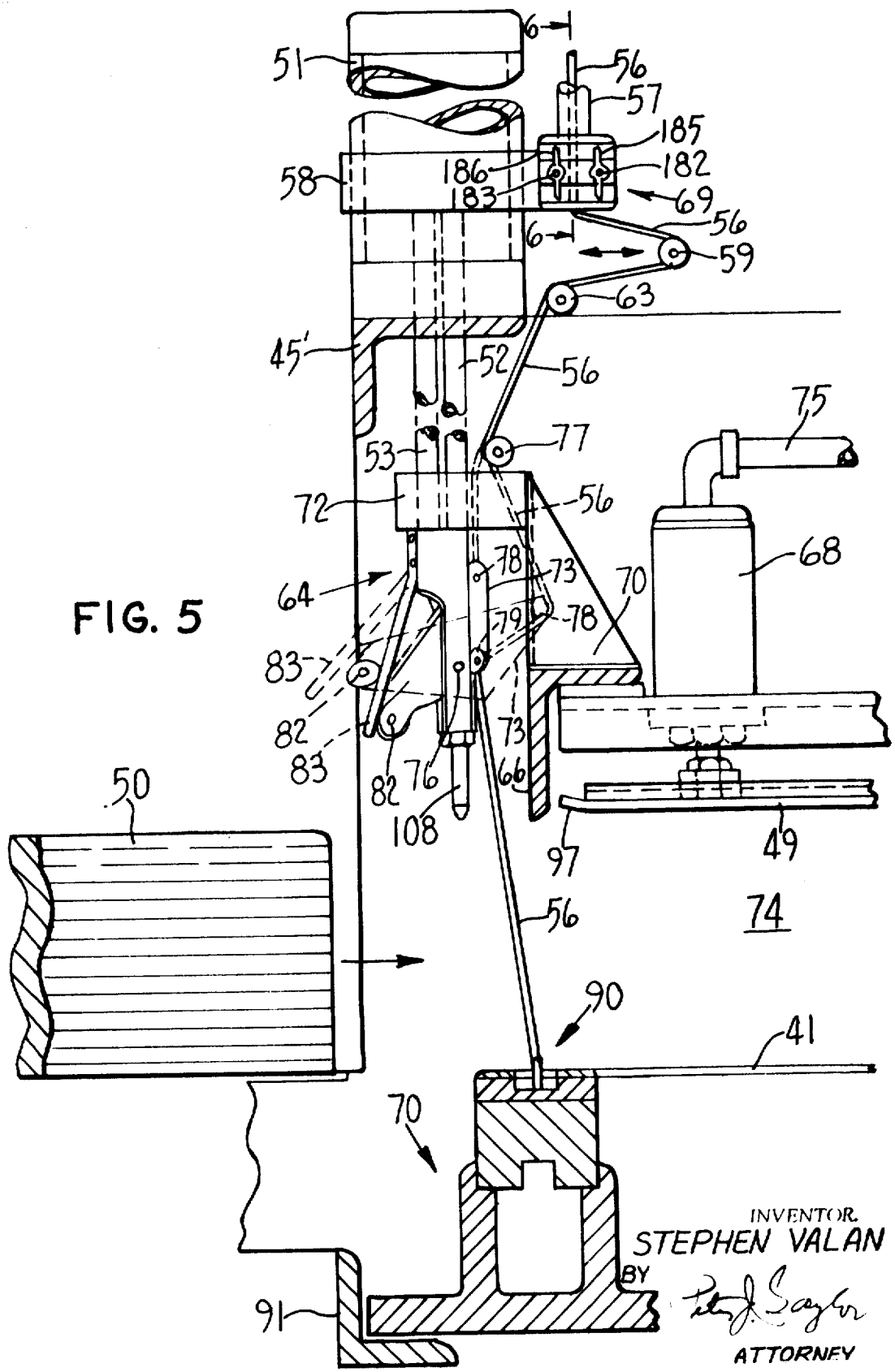
FIG. 5 depicts an enlarged side elevational view, partly in cross section, of the twine-aligning assembly and related portions of the unit depicted in FIG. 3.

It will be noted from FIG. 4 that when twine 56 is brought down over the front of bundle 50 by aligning assembly 64, it follows the centerline 100 of the crimper anvil, and thus is not in a vertical line across bundle 50. When setting arm moves in the horizontal position (as in the broken line position in FIG. 5), the arm moves the twine to the centerline 101 of the aligning assembly 64. This variation is merely a matter of about one-fourth inch and thus does not affect the quality of the binding.

When rams 52–53 and twine-aligning assembly 64 pass through a cutout in platform 41, at this point the roller on end 82 of twine setter arm 71 strikes adjustable pin 86, causing twine setter arm 71 to pivot around pin 76, which action inserts the twine into the crimping unit 90, in position for crimping and adjacent the other end of twine already in position from the previous cycle (FIGS. 22–30). Solenoid switch 109 actuates a conventional push-pull solenoid (not shown), which, in turn, permits one revolution of camshafts 117 and 117' (FIGS. 22–30), including six cam settings to effect the following operations: (1) Cutting the strip 121 and preforming the clip 99 on retractable anvil 120; (2) Raising and lowering the clip preform anvil 120; (3) Advancing and retracting the twine holder assembly 116 and 122 to form the clip around both pieces of twine; (4) Advancing the twine gripper 122 and releasing the held end of the twine, then continuing in and picking up the twine brought from spool 67 by assembly 64, whereupon the twine holder holds the twine fed from the spool; (5) Actuating the cutoff knives 119 (FIG. 30) or the heating element 158 (FIGS. 3 and 11) to cut off the remnant end, and at the same time, cut the twine above the twine holder which holds the twine fed from the spool 67; (6) Retracting the twine holder 122 into the holder holding the twine fed from the spool; and (7) Feeding the steel strip 121 for the crimping of clip 99, ready for the next cycle.

Switch 109, on angle member 88, actuates the fastening operations on the twine, cutting the twine, etc., for which means are mounted on frame member 91. FIGS. 22 to 30 depict such cam means, mounted in assembly 90, for operating the twine gripping, crimping, and cutting units which are mounted on frame member 91.

Cam assembly 110 comprises smaller cam surface 114, on which rides follower roller 112, connected to movable jaw 116 and 122. Another cam surface 111 has follower roller 210 connected to finger closing arm 113. A third cam surface 211 has follower roller 212 connected to the end of cutoff cam arm 198.

Cam assembly 213 has cam surface 214 on which rides roller 215 attached to preform and crimping arm 137. Another cam surface 216 has riding on it follower roller 217 attached to strip feed arm 199. Cam 191 advances arm 200 which retracts anvil 120. The shafts for these cam assemblies are rotated by electric motors (not shown).

In FIGS. 22–30, cam 190 serves to cut the strip, preform the clip 99, and complete the crimping operation. Cam 191 serves to raise and lower the clip preform anvil 120. Cam 193 advances and retracts the twine holder assembly 116 and 122. Cam 194 serves to close the twine holder onto the twine which is brought across the front face of the bundle 50. Cam 195 moves the cutoff knives 119, or the heating element cutoff and sealer 158, while cam 196 feeds the steel strip 121 for the crimp clip 99.

Figure 22:
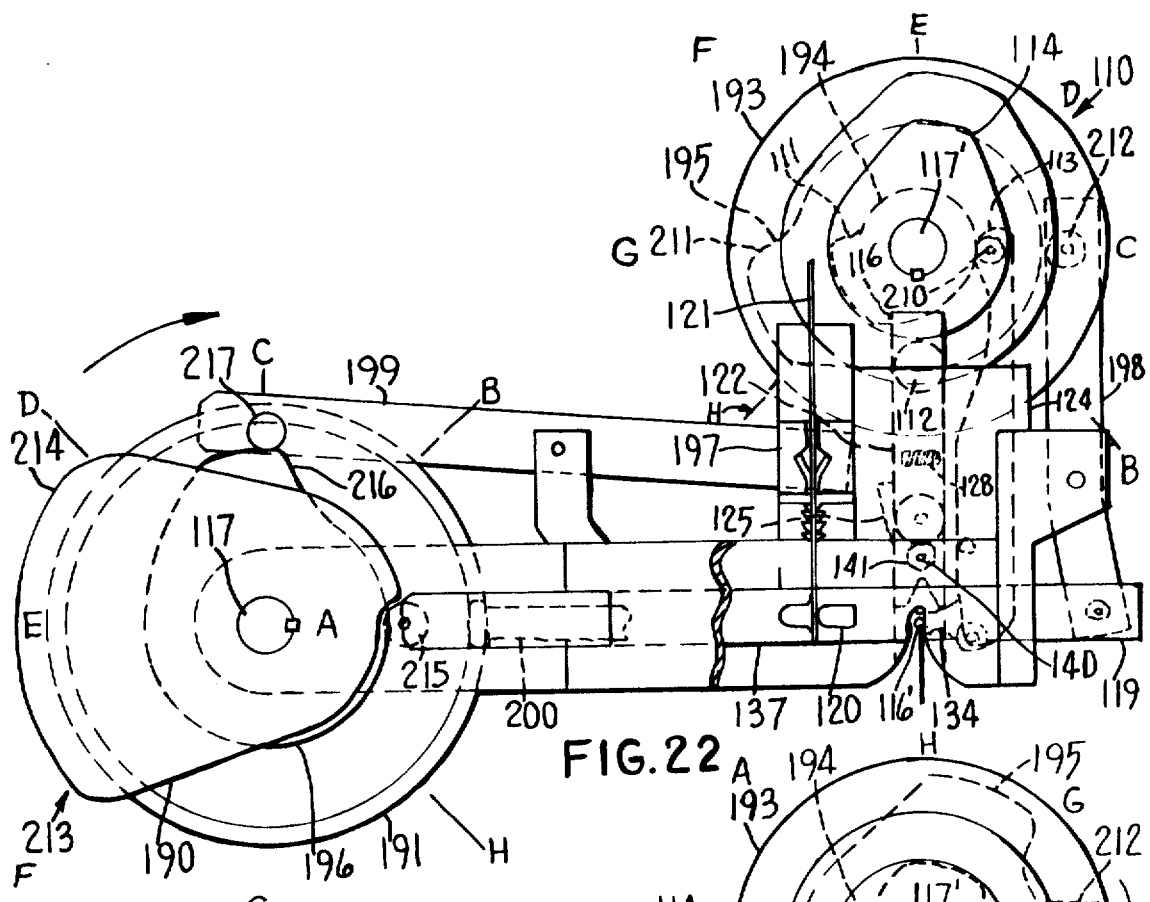
FIG. 22 to 29 present schematic top views of the cam assembly and the twine holding, clamping and cutting units operated thereby, at various sequential stages.

In FIG. 22, all of the cams are in active position, such as cams 190, 196, 191, 193, 194, and 195. When the twine-aligning assembly 64 is actuated by switch 98, and moves downwardly to contact switch 109 with pin 108, the switch actuates the solenoids riding on a single-revolution clutch, starting the mechanism 90 in motion. When all cams are in position B in FIG. 22, the steel strip 121 is cut and preformed by means of cam 190. Cam 196 retracts the strip feed 197, and cam 191 retracts preform anvil 120, while all the other cams 193, 194 and 195 remain in the "dwell" position. When all of the cams are in the C position in FIG. 22, cam 190 continues to move crimping arm 137 toward crimping anvil 134, while all other cams remain in the "dwell" position.

Figure 23:
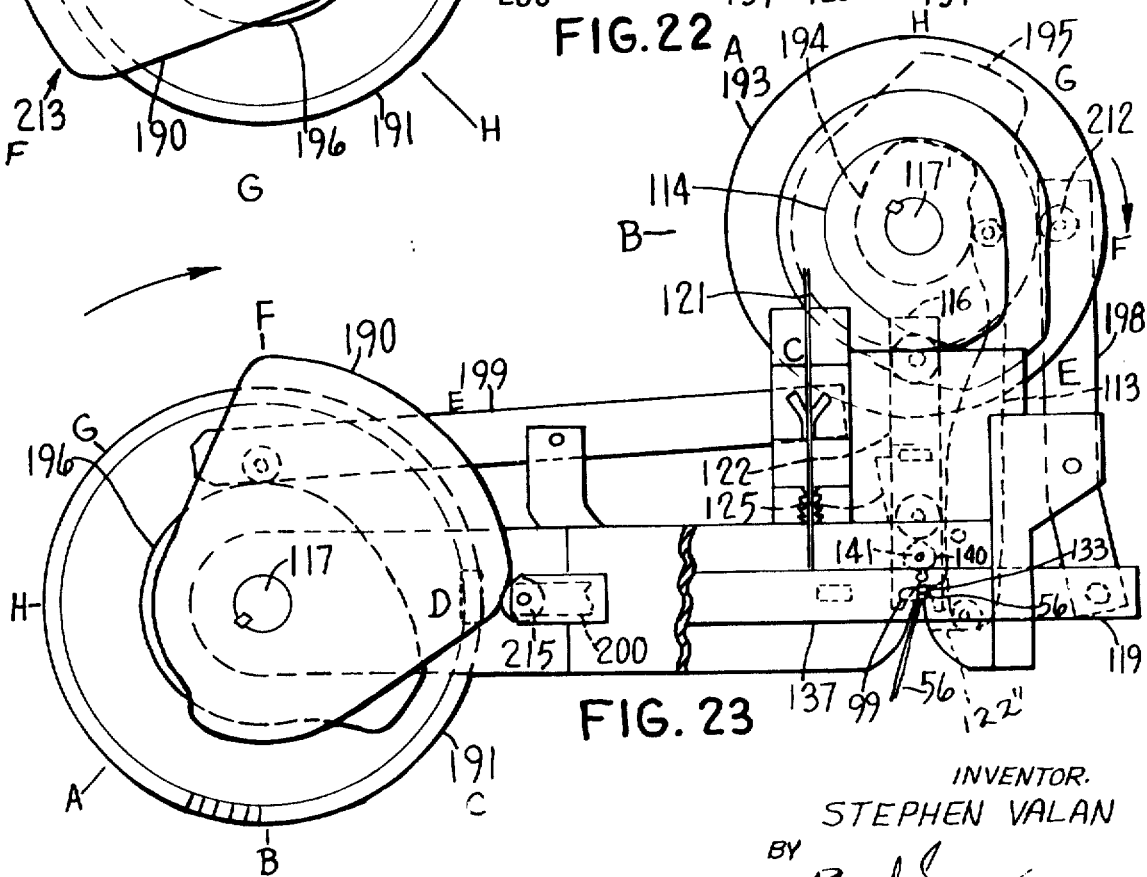

In FIG. 23, all of the cams are in the D position. Cam 190 continues to move crimping arm 137 to the crimping anvil 134, preforming the clip 99 around twine 133 and 56. Cam 193 now begins to move twine-holding finger 116 in toward the center, while cams 196, 191, 194 and 196 remain in the "dwell" position.

Figure 24:
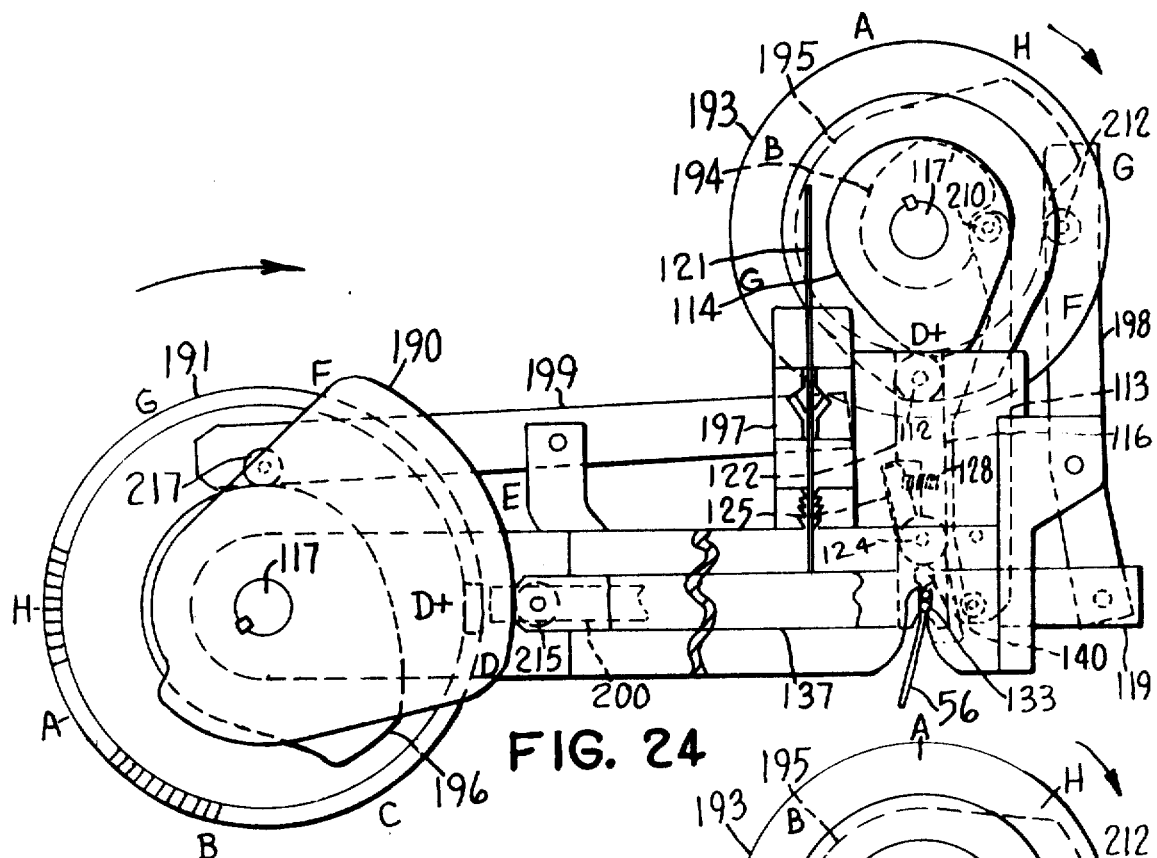

In FIG. 24, all cams are in the D+ position. Cam 190 completes the clip on twine 133 and holds it as cam 193 continues to move twine-holding finger 116 into the open position due to the action of spring 128 which releases finger 122, enabling the holding of twine end 133 in the open area 141 of twine-holding fingers 116 and 122. Now, the twine 133 is held by the clip, with arm 137 in "dwell" position on cam 190. All other cams 191, 196, 194, and 196 remain in "dwell" position.

Figure 25:
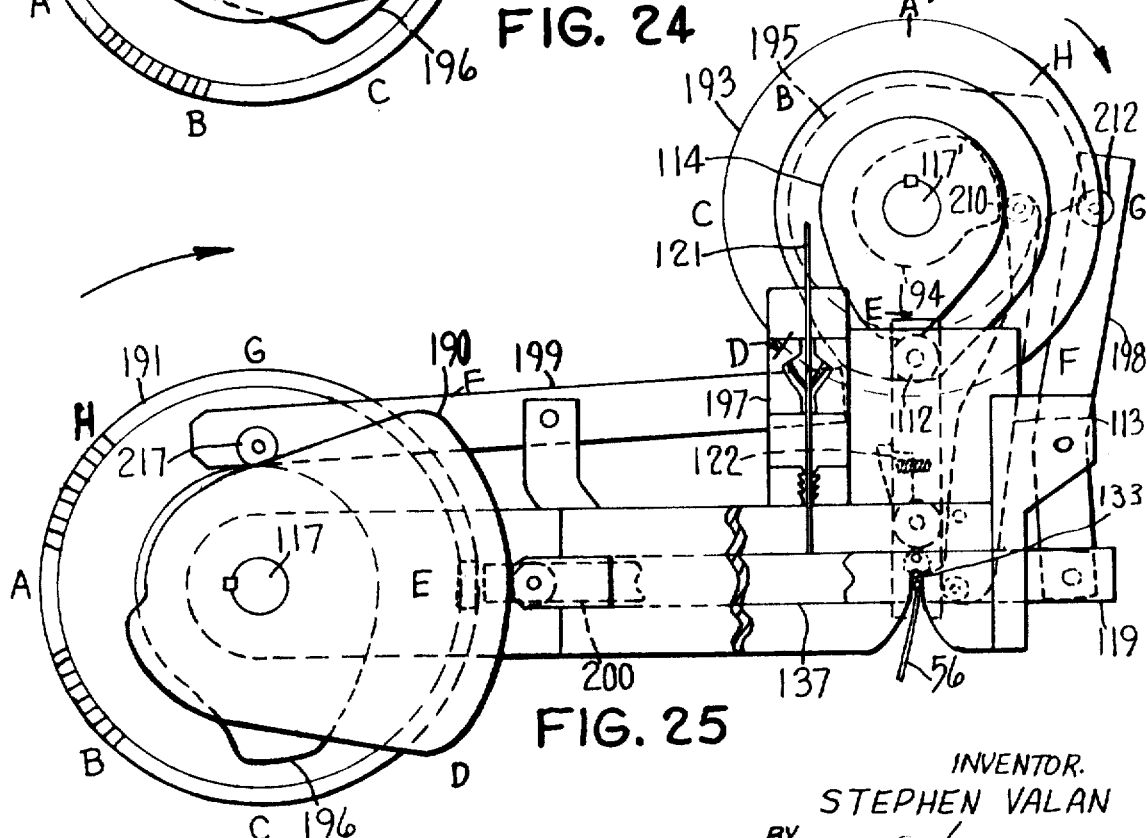

In FIG. 25, all cams are in E position. Cam 190 continues to hold arm 137 in "dwell" position, holding clipped twine 133 and 56 in position while twine 56 is now picked up by fingers 116 and 122, and cam 194 actuates lever 113 which closes finger 122 against spring 128 and around twine 56, holding the latter. Cam 195 actuates lever 198 which now initiates the action of knife 119 or hot cutter 158, and severs the remnant end 140 of twine 133 and twine 56 from the spool 67. Cams 196, 191, 194 and 195 remain in "dwell" position. When the cams are in G position, cam 190 continues to retract arm 137. Cam 194 releases knife 119 or hot-cut lever 198. Cams 196, 191, and 193 remain in "dwell" position.

Figure 26:
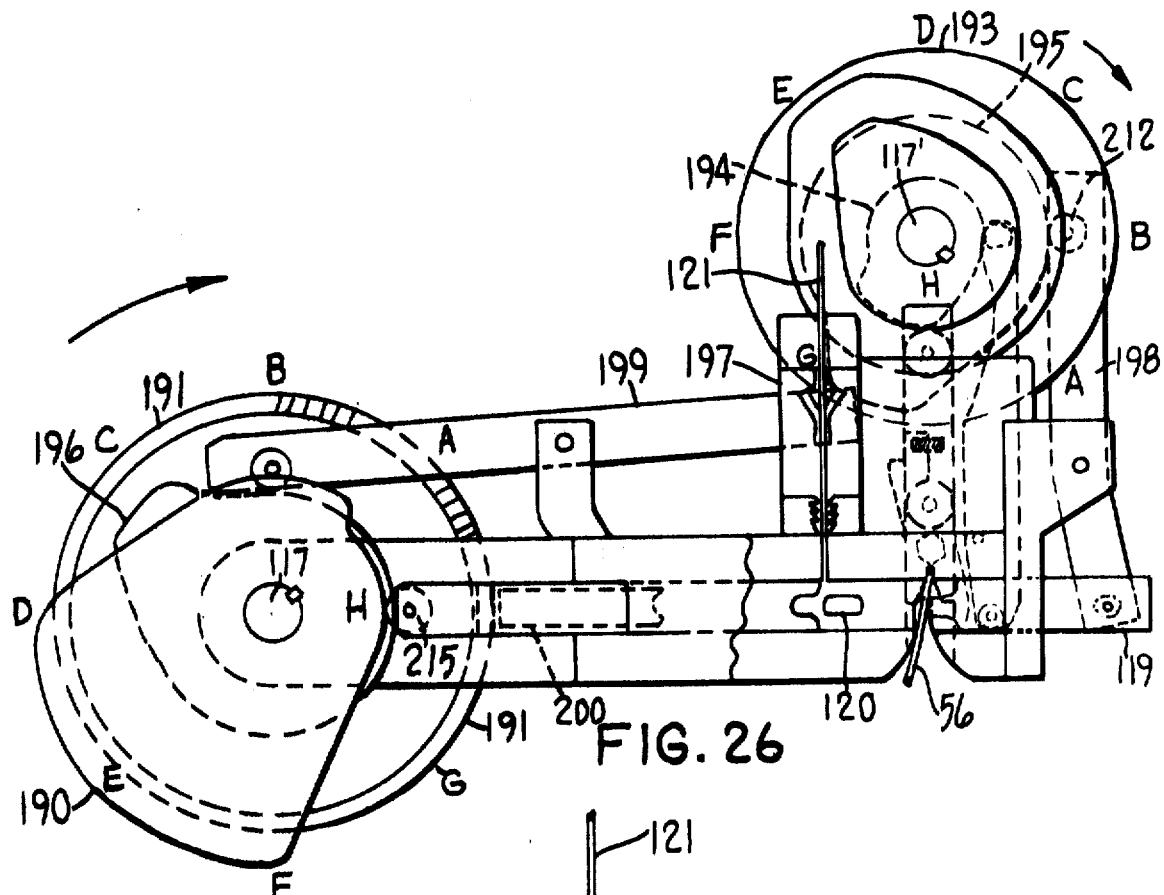

In FIG. 26, the cams are in H position, and cam 196 now starts moving in the strip feed lever 199 and strip feed 197. Cam 191 starts anvil arm 200 down, forcing anvil 120 upwardly. Cams 193, 194, 195 and 190 remain in "dwell" position. Between positions H and A, cam 191 continues to raise anvil 120. Cam 196 continues to feed strip 101. Cams 190, 193, 196, 195 and 194 remain in "dwell" position. When all cams reach position A, the single-revolution clutch is stopped, and the aligning assembly 64 is now retracted, the bound and fastened bundle is pushed out of the machine in the direction of the arrow, and the machine is ready for the next bundle.

Figure 27:
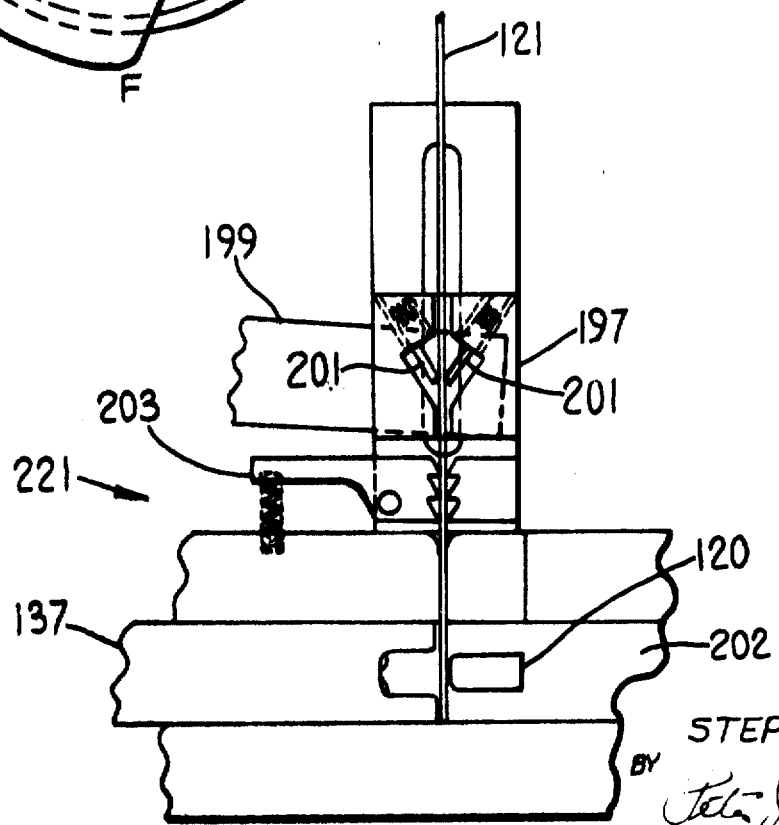

FIG. 27 depicts details of the steel-strip-feeding mechanism. When feed block 197 is advanced by cam arm 199, spring wires 201 applies pressure on steel strip 121, forcing steel strip 121 into chamber 202, when feed block 197 is retracted, strip-holding fingers 203 hold strip 121 in position. When feed block 197 is retracting, the spring wires 201 no longer have any force against their ends, thus permitting the spring wires 201 to slide along steel strip 101, preparing it for the next feed.

Figure 28:
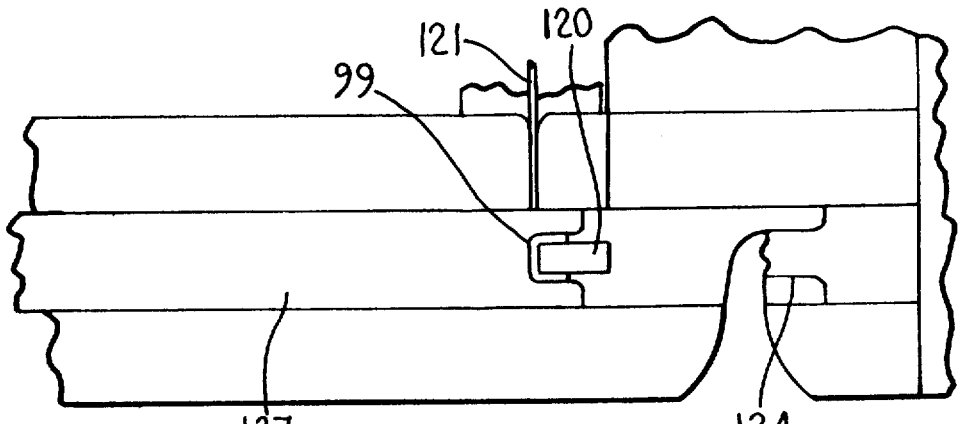

Details of preforming clip 99 are depicted in FIG. 28. When arm 137 advances further, it preforms clip 99 around retractable anvil 120, when anvil 120 is retracted, and arm 137 reaches the apex of cam 190, arm 137 will make contact with anvil 134, forming the complete clip around the twine.

Figure 29:
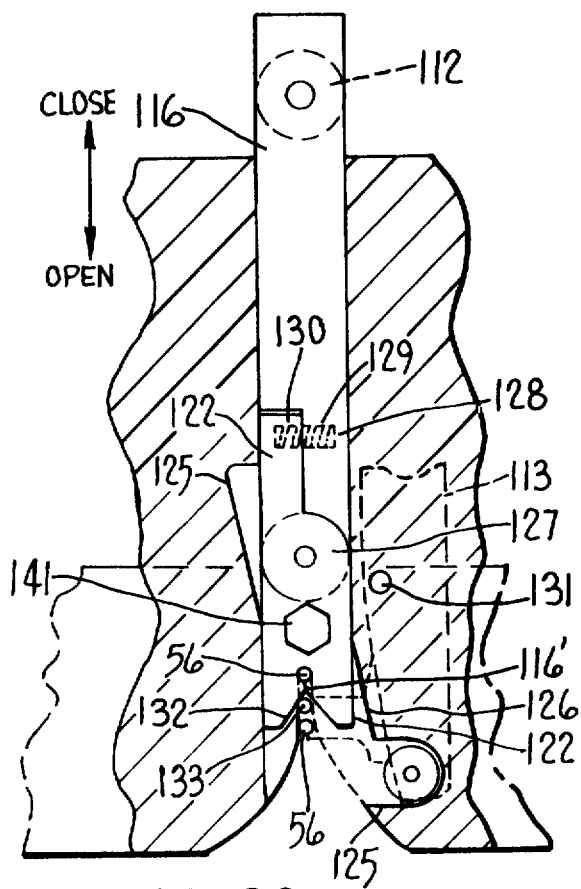
Figure 30:
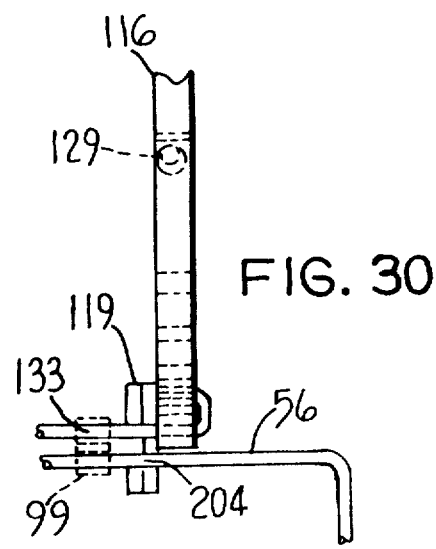
FIG. 30 shows a side view of the twine pickup finger and twine cutoff knives in position upon crimping of the clip.

The assembly details of twine pickup finger 116 are depicted in FIGS. 29 and 30. Finger 116 moves in the direction of the arrow. When fingers 116 and 122 advance toward the open position, twine 56 is held between the serrated jaws 116'. When finger 116 continues further, gripping arm 122 is forced into openings 125 and 126 by the action of spring 128, releasing the twine already crimped. Finger 116' then continues to complete its open position, and lever 113 closes finger 122 on the twine 56 from spool 67. The remnant end of the twine and the twine from the spool are then severed by knives 119 or hot cut 158. Finger 116 then retracts, holding the twine 56 from the spool. The cutoff piece of twine (about one-half inch) is allowed to fall into a scrapbox.

At the start of the cam cycle, bundle 50 is pushed into twine 56 (FIG. 13), drawing twine 56 from box 55 while the end of the twine is held securely at the lower end in twine holder serrated jaws 116'–122'. When the twine is completely around the three sides of bundle 50, motor 51 is actuated by switch 98, and the twine-aligning assembly 64 starts on the downstroke, bringing a loop of twine from the top front edge of bundle 50, down across the face of the bundle (position B in FIG. 2).

At the end of the downward stroke of rams 52–53, switch 109 is actuated, which starts the motor (not shown) for revolving the cam assembly 90, 213, etc., (FIGS. 22–30). Simultaneously, twine setter arm 71 pivots in the horizontal position (as shown by the broken lines in FIG. 5). This moves the twine from the front face of bundle 50 into the outside groove 133 of stationary anvil 134 of the twine-gripping assembly. Twine holder cam surfaces 135 and 136 "dwell" through A, B, and C (FIG. 23), during which time strip steel 121 for clip 99 is cut and preformed on retractable anvil 120 by crimping arm 137. This is accomplished by cam 190 in positions B and C.

At position D (FIG. 24), clip 99 is clamped around twine ends 56 and 133, and the twine holder assembly 116 and 122 continues outwardly, and after the twine is crimped, the crimping arm 137 holds the twine and clip in position against anvil 134, while pickup fingers 116 and 122 advance. At position D+, the twine clamp 122 opens on pivot 127, due to the action of spring 128, and arms 122 and 116 are forced into recesses 125 and 126, respectively, thus releasing the first end of the twine directly adjacent the "inside" groove 138 of anvil 134.

Between cam positions D and D+, as twine holder assembly 116–122 continues to advance (without holding the twine now), both ends of the twine have been crimped, as in FIGS. 22–24, by clip 99. The twine holder assembly 116–122 reaches the end of its stroke (cam position D+, and serrated jaws 116' are now open and are disposed adjacent to the twine in "outside" crimp jaw groove 133.

Thereafter, twine clamp 122 (FIG. 25) is closed on the second end of the twine in "outside" groove 133 by means of closing lever 113 which is driven by cam surfaces 111 during cam cycle D+ to E. This second end of the twine will continue to be held until the next bundle cycle reaches cam position D, as in FIG. 23.

Immediately after clamp 122 closes on the twine, twine cutoff knives 119, or the heated cutter 158, cut the twine about one-fourth inch below the crimp, as in FIG. 30, and directly above twine holder assembly 116-122. This action takes place just before the cam reaches position E.

After cutoff, twine remnant smaller 140 (about one-half inch) which consists of the first end of the twine only, drops through opening 141 (FIG. 29) in twine holder assembly 116-122, into a scrapbox below the machine. Thereafter, twine holder assembly 116-122 retracts during the cam cycle E to G to the position shown in FIG. 22, and proceeds through the remaining cam cycle G and H to A positions, which completes one revolution of the cam mechanism as the sequence ends. The valve of motor 51 is actuated at the end of the cam cycle, either by a switch 98, as pusher 92 is withdrawn, or by a switch (not shown) on the camshaft which is actuated at the end of the cam cycle. Rams 52-53 then retract, and the twine setter slides along the twine, the end of which is held at the bottom by the gripping mechanism until the starting position for the next cycle. Twine takeup roller 59 takes up any slack in the twine as the rams retract the aligning assembly 64 before the next bundle is pushed out of the machine in the direction of the arrow in FIG. 3.

Figure 19:
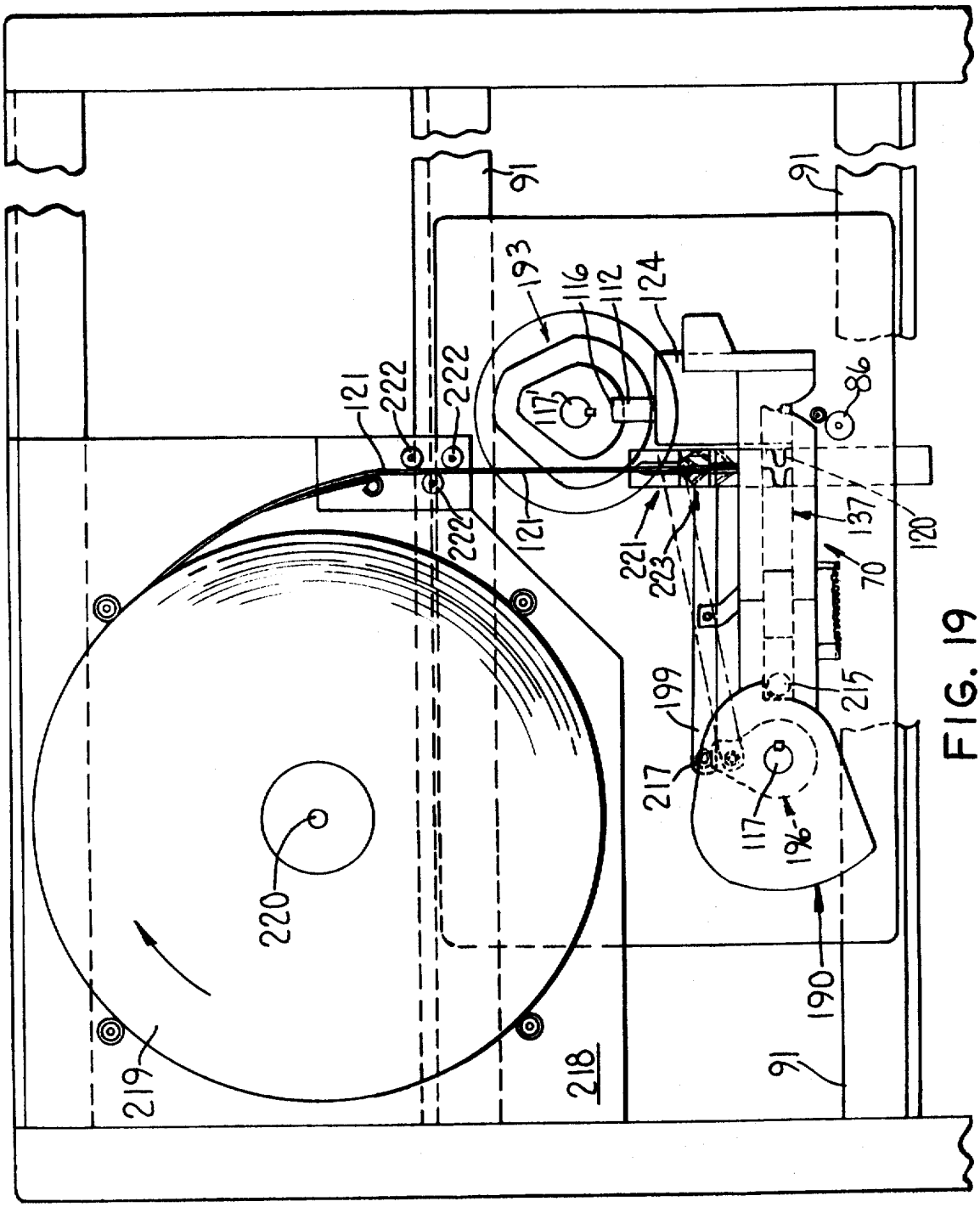
FIG. 19 illustrates, a top view of the metal-strip-feeding mechanism and associated cams.
Figure 20:
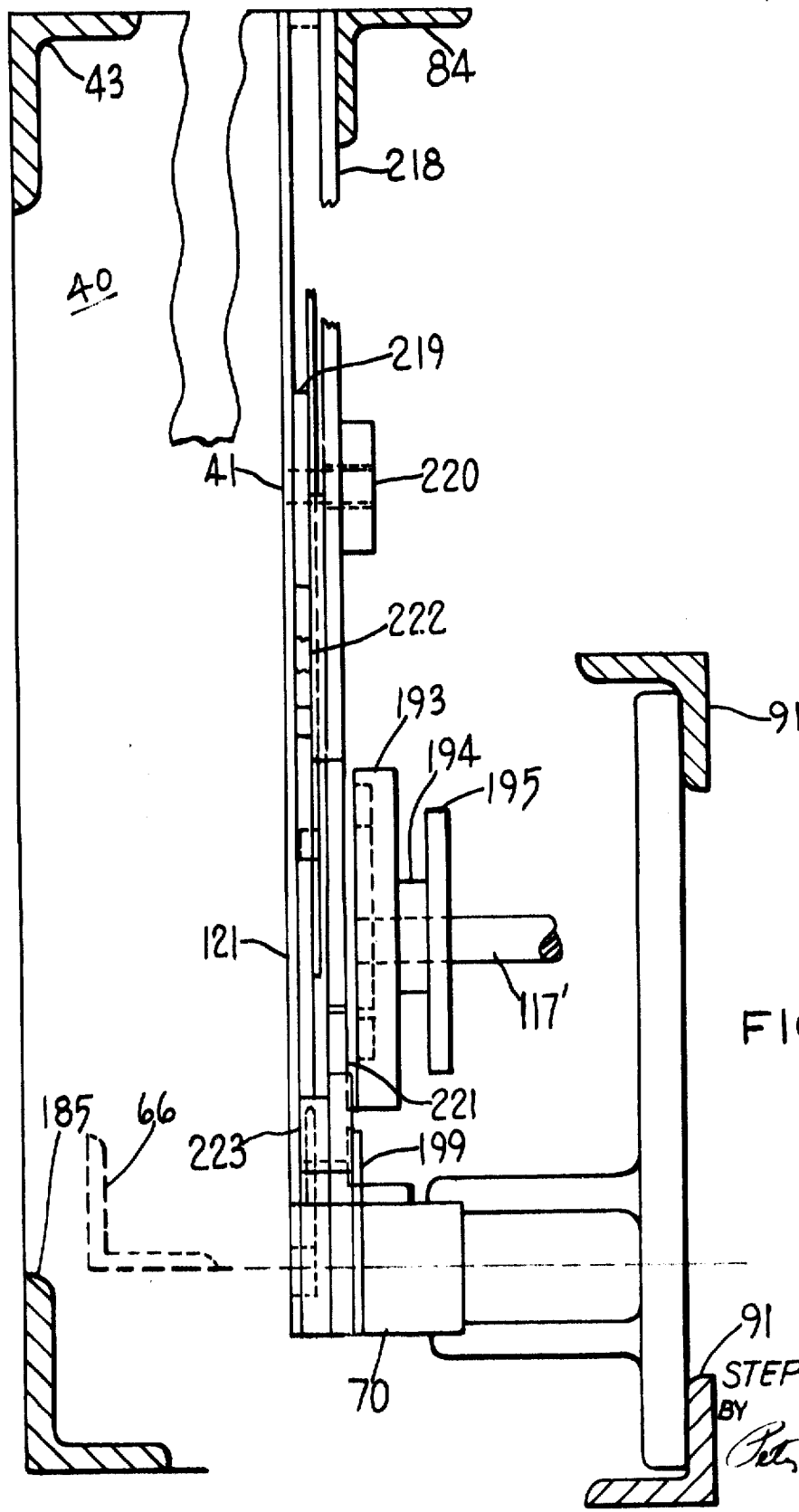
FIG. 20 depicts an elevational side view, partly in cross section, of the unit shown in FIG. 19.

Details of the metal strip feed mechanism are shown in FIGS. 19-21. A bottom support plate 218 is mounted on side frame 40 at 84, below platform 41 (FIG. 1). Coil 219 of metal strip, inserted on peg 220, feeds strip 121 past the strip straightening rollers 222, over the strip feed slide bracket 221 to the feed slide 223, which is actuated by lever 199 and cam 196, feeding the strip to chamber 137. This all occurs in the final stage of the crimping cycle.

An important feature of the present invention is the dual ram used in the pneumatic or hydraulic motor 51. In conventional single-ram motors, it is necessary to employ a guide rod which rides with the ram so as to prevent rotation of the ram. This has the disadvantage of requiring additional length and width and the additional work in making and mounting the guide rod. The latter also is subject to contamination and bending, which can cause binding of the ram. In the present invention, as depicted in FIGS. 14 and 15, the air motor includes a cylinder 143 in which rides piston 144 having seals 145. Two rams 52 and 53 have their one end mounted in piston 144. Cylinder 145 has a top end cap 146 and bottom end cap 147. A bearing seal 148 is mounted in lower cap 147, and holes 149-150 are provided in the bearing seal to permit rams 52-53 to reciprocate through holes 149-150, respectively, in air-sealing relation. Compressed air enters head 146 at 151, and it enters cylinder chamber 152 to force piston 144 downwardly. Exhaust air in chamber 153 discharges through outlet 154 in lower cap 147.

As shown in FIGS. 10-12, the bundle 50, after it has been circumscribed on four sides with twine 56, has the twine ends fastened with a clip 99. Each of the free ends 56a extending beyond the clip may 30. be fused, preferably into one mass 56b by the cutter heater unit 158 which may be employed to both cut the twine and effect the fusion simultaneously. FIGS. 16-18 depict a heated knife which may be used for such a purpose. This heated knife, indicated generally as 158, would be driven by cam follower 156, the operation of which is described herein in FIGS. 22-30. Knife blade 155 is disposed between two electrical heating elements 157-159, to which electrical current from a transformer is fed through lines 160-161. The unit is encased in a housing of insulating portions 162-163, disposed on insulating base 164.

The present machine can use, as binding twine, practically any flexible cord material, such as propylene, polyethylene, nylon, or other thermoplastic material, polyurethane, jute, cotton, or the like.

I claim:

1. A machine for binding a bundle with twine, said machine comprising:
   a frame;
   a platform mounted upon the frame for receiving a bundle to be bound;
   means for providing a supply of twine at a location spaced above the platform;
   twine-gripping means mounted upon the frame below the platform for holding a length of twine stretched across the space between said location and the platform such that as a bundle passes along the platform and through said space against the stretched twine, the twine will encompass three sides of the bundle;
   a ram mounted upon the frame for longitudinal reciprocating movement and including an end movable from a first position adjacent said location to a second position adjacent to and spaced laterally from the twine-gripping means;
   a twine-aligning assembly carried by the ram adjacent said end thereof for advancing twine from said supply along a longitudinal path of travel as the ram end moves from the first position to the second position, said twine-aligning assembly including means for moving the twine laterally out of said path of travel and into the twine-gripping means in response to the arrival of the ram end at said second position;
   means for maintaining a prescribed tension in the twine advanced from said supply to the twine-aligning assembly;
   crimping means mounted upon the frame for crimping a fastener around the twine between the platform and the twine-gripping means;
   twine-cutting means mounted upon the frame for cutting the twine between the crimped fastener and the twine-gripping means;
   first means for actuating the ram to move the end thereof from said first position to said second position;
   second means for actuating, in sequence, the twine-gripping means, the crimping means and the twine-cutting means in response to the arrival of the ram end at the second position; and
   third means for returning the ram end to the first position in response to completion of the actuation of the twine-cutting means, with the twine held in the twine-gripping means such that said length of twine is held stretched across the space between said location and the platform.

2. A machine, according to claim 1, in which said twine-aligning assembly comprises:
   a centrally pivoted setting arm through which said twine is designed to ride, and which is arranged to ride in a longitudinal position as said ram end travels between said first and second positions thereof,
   a pair of rollers mounted in line on one end of said arm in a manner such that when said other end of said arm is raised to set said arm in a substantially lateral position, said twine passes around the innermost roller and then around the outermost projecting roller for feeding said twine into said gripping means.

3. A machine, according to claim 2, in which pin means is disposed on said frame below said platform and is designed to raise said other end of said setting arm when the ram end arrives at the second position thereof, and
   spring means mounted above said other arm end on said ram and designed to return said arm to said longitudinal position on return of said ram end toward said first position thereof.

4. A machine, according to claim 1, in which spring-biased rollers are disposed on said frame between the twine supply and said ram to maintain constant tension on said twine.

5. A machine, according to claim 1, in which a pressure plate is resiliently mounted on said frame over said space above said platform, and moving means for moving said plate over a bundle disposable on said platform for holding said bundle during said binding operation.

6. A machine, according to claim 5, comprising:

a threaded vertical rod mounted near each of four corners of said frame and having their lower ends attached, in rotatable relation, to said plate, a threaded sprocket attached to each corner of the frame and in coacting relation with each rod disposed thereat, a motor designed to drive said sprockets, and a chain connecting all sprockets and said motor shaft in a manner such that the rotation of the sprockets by said motor moves said pressure plate.

7. A machine, according to claim 1, in which the ram comprises a dual ram.

8. A machine, according to claim 1, in which the twine is made of thermoplastic material, and the twine-cutting means comprises a heated knife designed to cut and fuse the two twine ends projectable from the crimped fastener.

9. A machine, according to claim 1, in which said ram has a longitudinally projecting pin, and said second means is mounted in a manner such that, when said ram end reaches the second position, said latter projecting pin actuates said latter second means.

10. A machine, according to claim 1, in which said twine-gripping means comprises:

a pair of gripping jaws for gripping said twine fed thereto by said twine-aligning assembly, and moveable cam means for effecting the gripping of the twine in proper sequence.

11. A machine, according to claim 1, in which said crimping means comprises:

means for holding a supply of metal strip, a retractable anvil, feeding means for feeding said strip over said anvil for preforming a clip, cutting means for cutting said strip during said preforming, crimping arms for crimping said preformed clip after said anvil is retracted and over the two twine portions gripped by said gripping means, and movable cam means for effecting the said latter operations in proper sequence.

12. A machine, according to claim 1, in which said twine-cutting means comprises a pair of knives designed to cut said crimped twine while the supply portion of said twine is held by said gripping means, and movable cam means for effecting said latter operations in proper sequence.